United States Patent [19]
Gosling

[11] Patent Number: 5,951,222
[45] Date of Patent: Sep. 14, 1999

[54] BOLTING SYSTEM WITH SECURED NUTS, AND METHOD THEREOF

[75] Inventor: Martin Charles Gosling, Hamilton, Canada

[73] Assignee: Siemens Westinghouse Power Corporation, Orlando, Fla.

[21] Appl. No.: 08/834,338

[22] Filed: Apr. 16, 1997

Related U.S. Application Data

[63] Continuation-in-part of application No. 08/584,858, Jan. 11, 1996, Pat. No. 5,842,263.

[51] Int. Cl.⁶ ....................................................... F16B 39/04
[52] U.S. Cl. ................................. 411/87; 29/452; 81/57.38
[58] Field of Search ................... 29/452, 525.02; 81/57.38; 254/29 A; 411/87; 403/362, 320

[56] References Cited

U.S. PATENT DOCUMENTS

| | | | |
|---|---|---|---|
| 176,335 | 4/1876 | Morton | 411/87 |
| 465,848 | 12/1891 | Gray | 411/87 |
| 1,195,165 | 8/1916 | Baker | 411/87 |
| 1,544,627 | 7/1925 | Bateman | 411/87 |
| 2,890,734 | 6/1959 | Mullin | 151/33 |
| 4,889,458 | 12/1989 | Taylor | 411/383 |
| 5,116,178 | 5/1992 | Lerman et al. | 411/87 |
| 5,167,059 | 12/1992 | Plasse et al. | 29/433 |
| 5,228,541 | 7/1993 | Plude | 188/1.11 |
| 5,468,103 | 11/1995 | Leeson | 411/87 |
| 5,489,174 | 2/1996 | Lesson | 411/87 |
| 5,624,218 | 4/1997 | Dauwalter | 411/87 |

FOREIGN PATENT DOCUMENTS

| | | |
|---|---|---|
| 0609925 | 8/1994 | European Pat. Off. . |
| 1150062 | 4/1969 | United Kingdom . |
| 2032822 | 5/1980 | United Kingdom . |
| 2223075 | 3/1990 | United Kingdom . |
| 2236372 | 4/1991 | United Kingdom . |
| 2247928 | 3/1992 | United Kingdom . |
| 2274892 | 8/1994 | United Kingdom . |

OTHER PUBLICATIONS

Goodier, J.N., "The Distribution of Load on the Threads of Screws", *Journal of Applied Mechanics* Mar., 1940, pp. A-10-A-16.
Gosling, M.C., "Improved Turbine Cylinder Bolting System" (unpublished).
Stoeckly, E.E. and Macke, "Effect of Taper on Screw–Thread Load Distribution", *Transactions of the ASME* Jan., 1952, pp. 103–110.

*Primary Examiner*—S. Thomas Hughes
*Assistant Examiner*—Jermie E. Cozart

[57] ABSTRACT

A bolting system secures its nuts with locking pins and securing portions. The first and second bolts extend through a surface in the same general orientation, wherein each of the bolts has a threaded end. First and second nuts are engaged with the bolts' threaded ends. Each nut has a nut wall with a threaded inner surface, an opposing outer surface, and a pin insertion hole radially extending at least partially through the nut wall from the outer surface. First and second locking pins are disposed in the pin insertion holes, each pin having a top portion that extends beyond the outer surface. The top portion has at least one aperture extending therethrough. A first securing portion extends through the first locking pin aperture and is secured around the first nut outer surface. A second securing portion extends through the second locking pin aperture and is secured around the second nut outer surface. A third securing portion is secured through the apertures of the first and second pins.

12 Claims, 10 Drawing Sheets

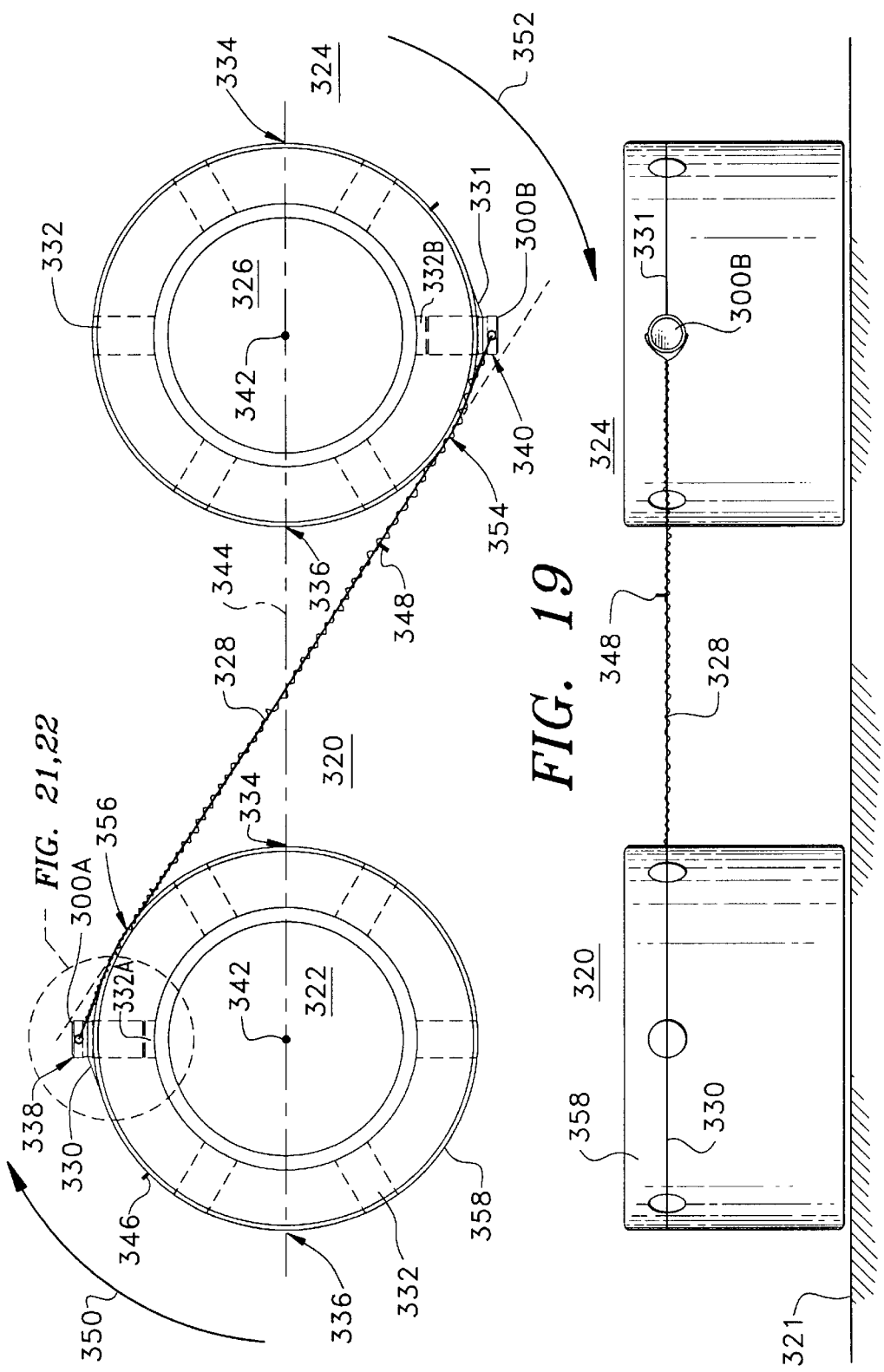

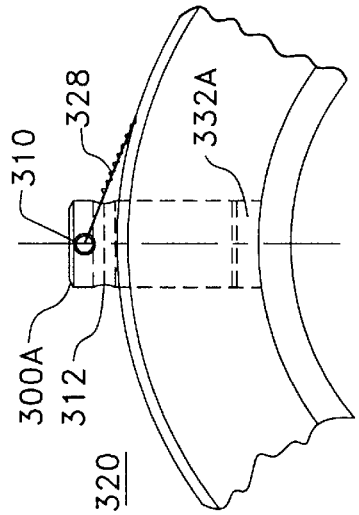
FIG. 21
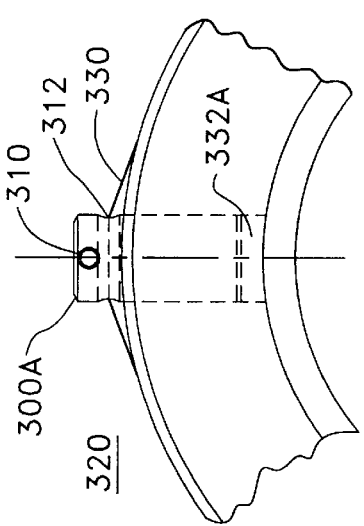
FIG. 22
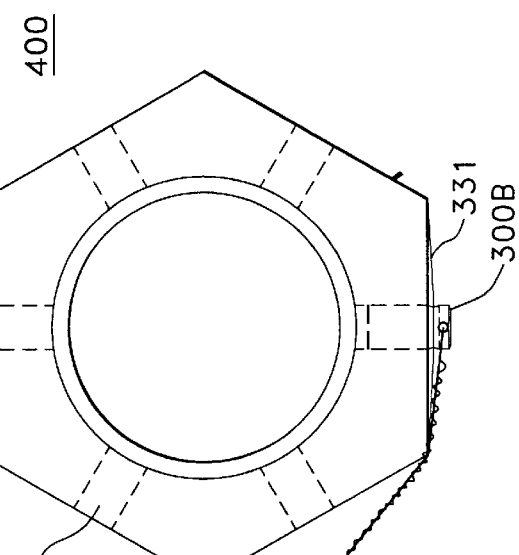
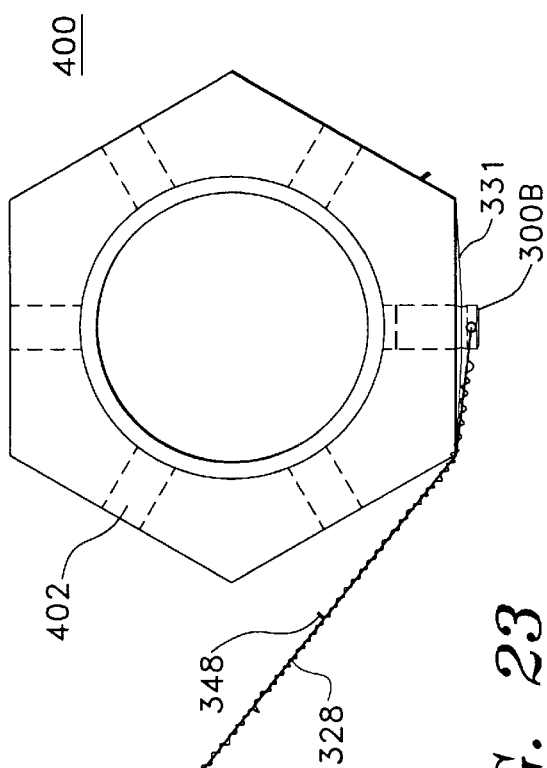
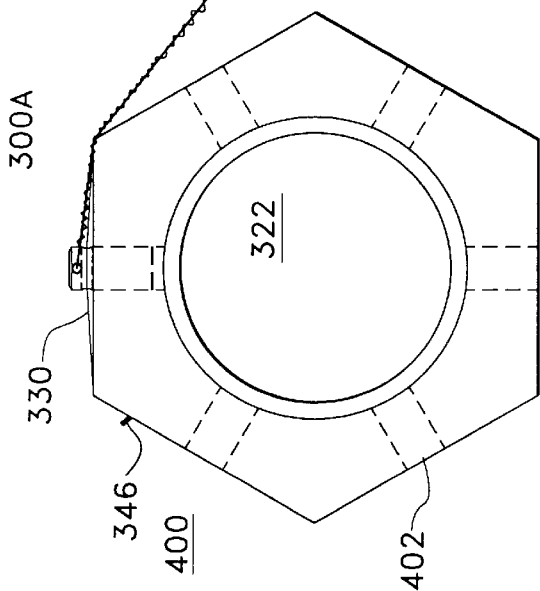
FIG. 23

BOLTING SYSTEM WITH SECURED NUTS, AND METHOD THEREOF

This is a continuation-in-part of application Ser. No. 08/584,858, filed Jan. 11, 1996, now U.S. Pat. No. 5,842,263, which is incorporated herein by reference in its entirety.

FIELD OF THE INVENTION

The present invention relates to securing the nuts engaged with bolts.

DESCRIPTION OF THE PRIOR ART

The prior art discloses that bolts in turbines and other applications are pretensioned by axially rotating the nut to a certain torque. Proper bolt tensioning is ensured by stretching the bolt to a specific elongation. However, rotating the nut to a certain torque is not an accurately repeatable method to stretch a bolt. To ensure a proper elongation of a bolt using the torque method, the bolt is repeatedly stretched and measured until it is achieved. Repeating the stretching and measuring procedure is inefficient.

The prior art also discloses that the nuts of axially rotated and tensioned bolts in an engine are secured to each other using lockwire. This is typically done to nuts that are inside an engine to prevent a loose nut from being caught in the gas streaming through the engine and damaging it. The lockwire is passed through a hole in the nut wall that has been drilled at an angle to the nut's axis. A number of angled holes needs to be drilled to ensure the proper hole positioning, resulting in a weakened nut.

SUMMARY OF THE INVENTION

The invention provides a bolting system with secured nuts. First and second bolts extend through a surface in the same general orientation, wherein each of the bolts has a threaded end. First and second nuts are engaged with the bolts' threaded ends. Each nut has a nut wall with a threaded inner surface, an opposing outer surface, and a pin insertion hole radially extending at least partially through the nut wall from the outer surface. First and second locking pins are disposed in the pin insertion holes, each pin having a top portion that extends beyond the outer surface. The top portion has at least one aperture extending therethrough. A first securing portion extends through the first locking pin aperture and is secured around the first nut outer surface. A second securing portion extends through the second locking pin aperture and is secured around the second nut outer surface. A third securing portion is secured through the apertures of the first and second pins.

BRIEF DESCRIPTION OF THE DRAWINGS

FIGS. 19 and 20 are two different views of a pair of cylindrical nuts secured with securing portions.

FIGS. 21 and 22 are detail views of FIG. 19.

FIG. 23 is a plan view of a pair of hexagonal nuts secured with securing portions.

DETAILED DESCRIPTION OF THE PREFERRED EMBODIMENT(S)

Figure 1:
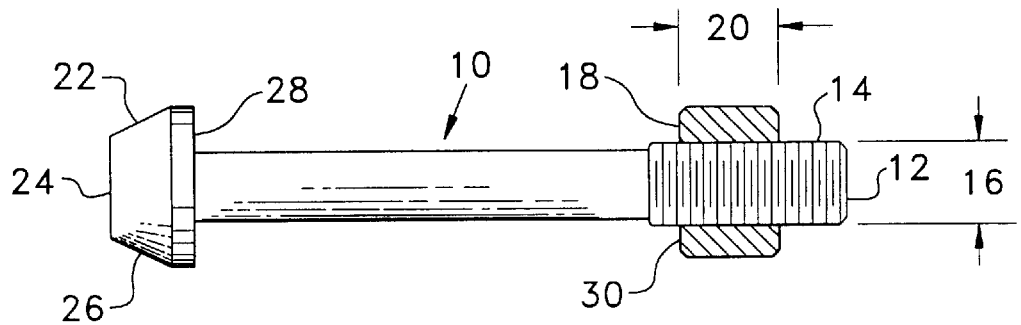
FIGS. 1, 2, and 3 illustrate the different types of bolts that may be used in connection with the practice of the invention.
Figure 2:
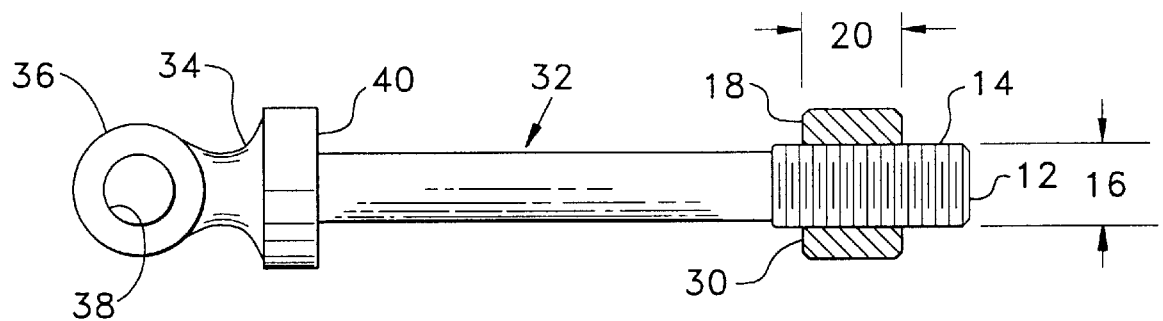
Figure 3:
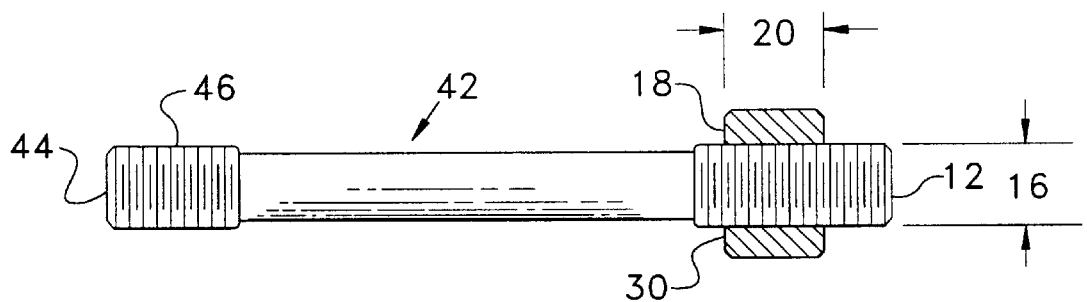

Now referring to the figures, wherein like reference numerals refer to like elements, and in particular to FIGS. 1, 2 and 3, bolt 10, ring bolt 32, and stud 42 are shown, respectively. Bolts 10 and 26 and stud 42 each have a first end 12 with parallel male threads 14 and a diameter 16. In the preferred embodiment, parallel male threads 14 are sized to be eight per inch and can be cut or rolled. Each first end 12 is engaged with nut 18 (shown in cross-sectional view). In the preferred embodiment, nut 18 has a height 20 that is approximately equal to diameter 16. Further, nut 18 has a nut underside 30 which is the annular surface of nut 18 which does not face first end 12.

Bolt 10 has a second end 22 with an ultrasonic mount top surface 24, a truncated conical side surface 26, and a flange contact surface 28. Ultrasonic mount surface 24 is a flat surface on the end of second end 22. An ultrasonic elongation measuring system (not shown) can be placed on ultrasonic mount surface 24 in order to measure the length of bolt 10. This eliminates the need to use an internal micrometer to measure bolt 10 elongation. Truncated conical side surface 26 has a smaller diameter end adjacent to sonar mount surface 26 and a larger end adjacent to flange contact surface 28. Flange contact surface 28 faces first end 12 and nut underside 30. When bolt 10 and nut 18 are engaged and holding together a flange (not shown), both flange contact surface 28 and nut underside 30 are in contact with the flange.

Ring bolt 32 has a second end 34 with a ring 36 mounted to it. Ring 36 has a ring aperture 38. Ring 36 is mounted to second end 34 such that the major axis of ring 36 is normal to the major axis of ring bolt 32. The center of ring 36 lies in the major axis of ring bolt 32. Second end 34 has a flange contact surface 40 that faces first end 12 and nut underside 30. Flange contact surface 40 is analogous to flange contact surface 28 of bolt 10. Ring bolt 32 is used when a parallel action hydraulic tensioner is used to stretch the bolt (described below).

Stud 42 has second end 44 which has a parallel male thread 46. Stud 42 is used when a blind flange (not shown) is used or when an additional nut (not shown) is used to secure stud 42.

Figure 4:
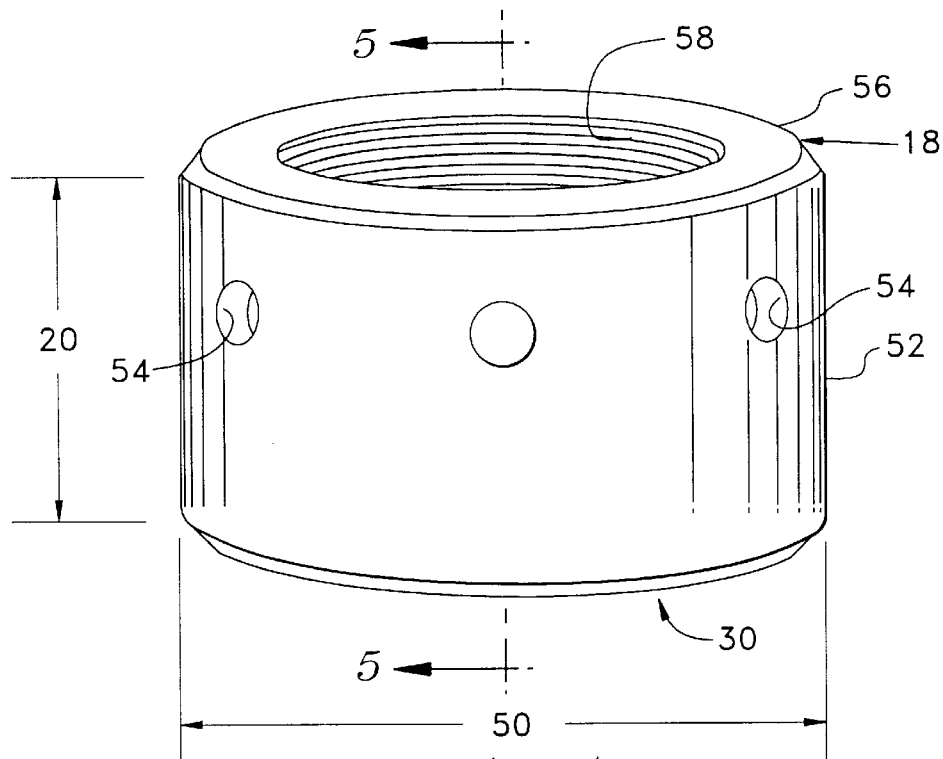
FIG. 4 is a perspective view of a nut that may be used in connection with the practice of the invention.

Now referring to FIG. 4, nut 18 has outer diameter 50, height 20, nut underside 30 (not shown), cylindrical side surface 52, nut top surface 56, and internal threads 58. Spaced laterally around cylindrical side surface 52 are key holes 54. The purpose of key holes 54 is that nut 18 is rotated on first end 12 by placing a key (not shown) into a key hole 54 and moving the key in a circumferential direction.

Figure 5:
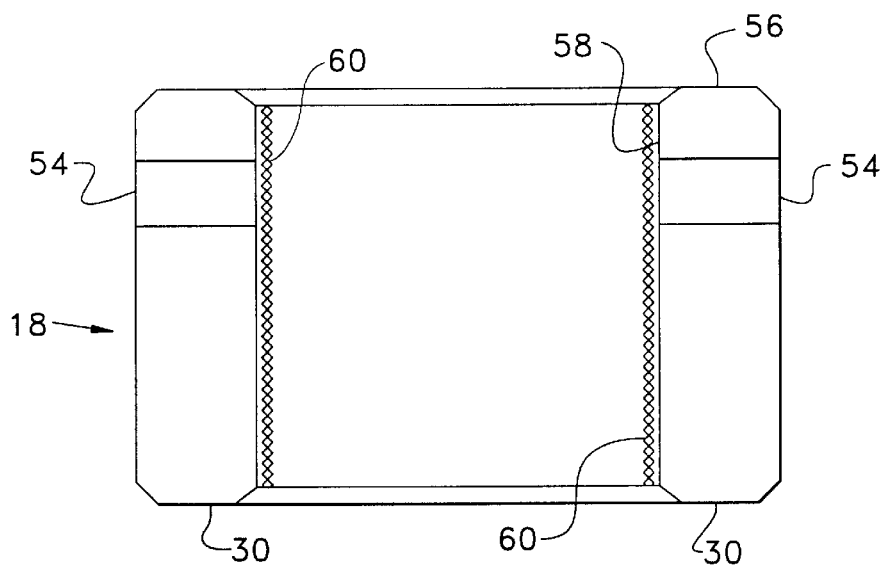
FIG. 5 is a cross-section taken through line 5—5 of FIG. 4.

Now referring to FIG. 5, key holes 54 extend through the wall of nut 18 in a generally radial direction. Other embodiments of the invention may have keyholes that extend partially through the wall of the nut and/or the keyholes may not extend in a generally radial direction. Nut 18 has coil insert 60 engaging internal threads 58. Coil insert 60 is used because it distributes the force on a bolt relatively evenly throughout parallel male threads 14 when first end 12 of bolt 10 is engaged with nut 18. This allows the use of parallel male threaded bolts and studs instead of cut and tapered threaded bolts and studs.

Figure 6:
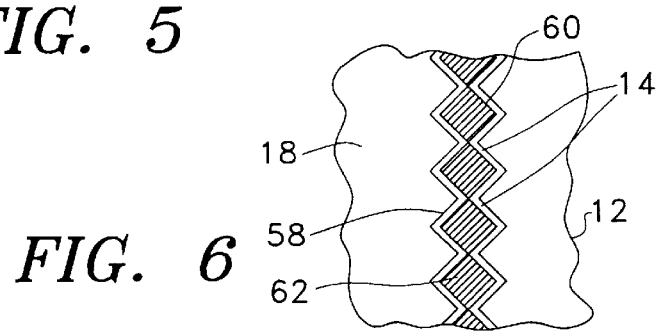
FIG. 6 illustrates a detail of a bolt engaged with a nut.

Now referring to FIG. 6, a detail of a cross section of first end 12 engaged in nut 18 is shown. The parallelogram cross section 62 of coil insert 60 fits in between internal threads 58 and parallel male threads 14.

Figure 7:
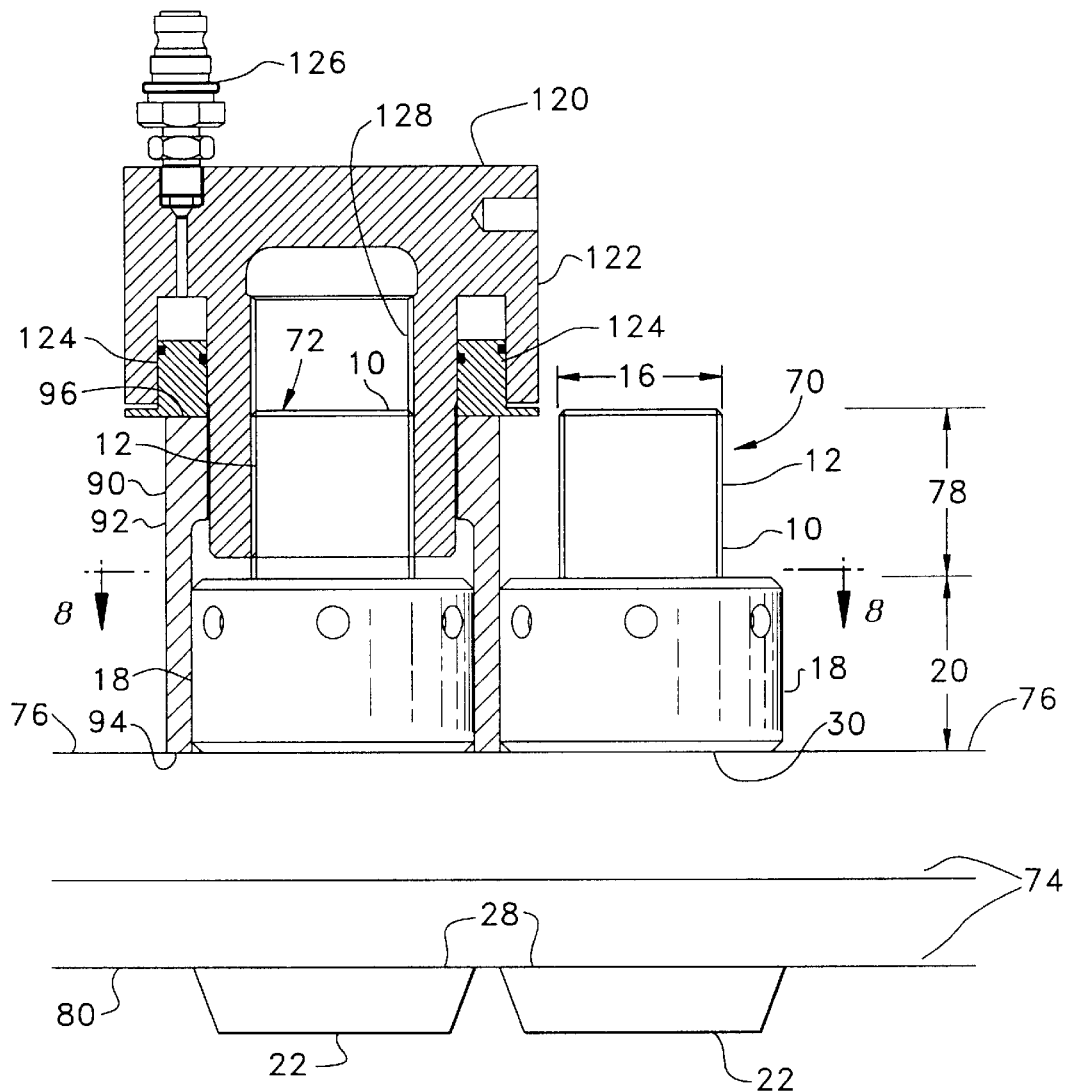
FIG. 7 illustrates a bolt being tensioned using a bridge element and a hydraulic bolt tensioner.

A right nut and bolt system 70 and a left nut and bolt system 72, as depicted in FIG. 7, are holding together flanges 74. Both right and left nut and bolt systems 70 and 72 are comprised of a bolt 10 extending through an aperture (not shown) in flanges 74, first end 12 extending above surface 76 and engaging with nut 18. First end 12 extends above nut 18 a distance 78 which is approximately equal to diameter 16 of bolt 10 and height 20 of nut 18, respectively. Nut underside 30 is adjacent to surface 76. In the preferred embodiment, flange contact surface 28 of second end 22 is adjacent to other flange surface 80. In another embodiment of the invention, a washer is placed between flange contact surface 28 and flange 74 (not shown).

Hydraulic tensioner 120 is mounted on left nut and bolt system 72. In order to mount hydraulic tensioner 120 on any nut and bolt system, bridge element 90 is needed. In the preferred embodiment, bridge element 90 is a tube-like structure with a wall 92, a wall bottom edge 94, a wall top edge 96, and a key opening 98 (see FIG. 8). Bridge element 90 forms the base upon which hydraulic tensioner 120 exerts a force in order to stretch and tension bolt 10. Wall bottom edge 94 rests on surface 76 of flanges 74. Wall 92 surrounds nut 18 and the portion of first end 12 that extends above nut 18. Wall 92 and wall bottom edge 94 are constructed to complement and accommodate surface 76 and anything else in the vicinity of the bolt being tensioned.

Figure 8:
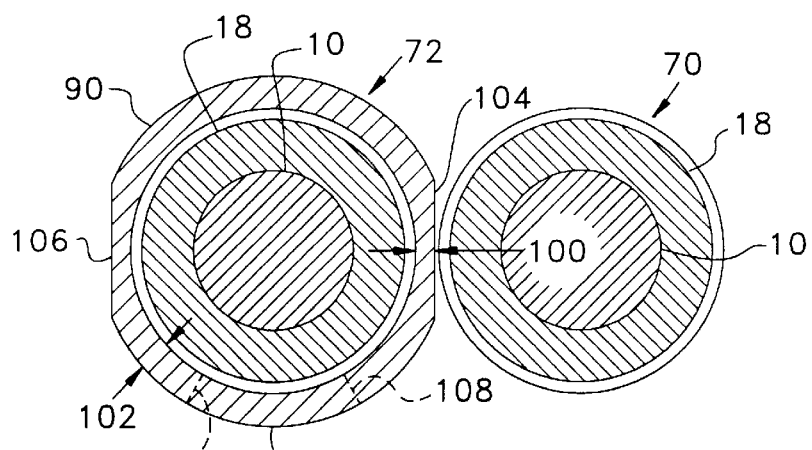
FIG. 8 is a cross-section taken through line 8—8 of FIG. 7.

Referring now to FIG. 8, a sectional view of left and right nut and bolt systems 70 and 72 shows bridge element 90 complementing and accommodating right nut and bolt system 72. The majority of wall 92 has a thickness 102. However, distance 100 between the two nuts of systems 70 and 72 is smaller than thickness 102. A section of wall 90 is removed, leaving accommodating surface 104. Wall 90 at accommodating surface 104 is thin enough to reside between nuts 18. As a result, bridge element 90 surrounds nut 18 of left nut and bolt system 72 and wall bottom edge 94 rests on surface 76. Wall 90 has a second accommodating surface 106 opposite accommodating surface 104, so that wall 90 can be used in a similar but reversed situation. Key opening 98 is an opening in wall 92 that allows a key to be inserted in key holes 54 of nut 18. Key opening 98 is a latitudinal opening in wall 92 and defined by vertical surfaces 108.

The invention is not limited to bridge elements of the configuration of bridge element 90. Bridge elements are designed not only to accommodate close pitched nut and bolt systems, but other situations such as narrow flanges and protruding equipment surfaces. However, the contact area between bridge element 90 and surface 76 cannot be so small so as to have hydraulic tensioner 120 exerting a force per area that would breach the structural integrity of flange 74.

Referring again to FIG. 7, hydraulic tensioner 120 comprises cylinder 122, piston 124 and hydraulic fitting 126. Cylinder 122 has female threads 128 to engage parallel male threads 14 on bolt 10. Piston 124 is annular and resides in cylinder 122. Hydraulic tensioner 120 is constructed such that when female threads 128 are engaged with bolt 10, cylinder 122 extends into bridge element 90 and piston 124 rests on top wall edge 96. To engage hydraulic tensioner 120, first bridge element is placed on surface 76 and around nut 18, then hydraulic tensioner 120 is rotated onto bolt 10 until piston 124 rests on bridge element 90. To stretch bolt 10, hydraulic fluid is pumped into cylinder 122 via hydraulic fitting 126, causing piston 124 to extend from cylinder 122. This results in cylinder 122 moving away from second end 22 of bolt 10, thus stretching bolt 10. This method of axial tensioning of bolts and studs allows the stretching of bolts and studs to be calibrated to a specific hydraulic load of hydraulic tensioner 120. This speeds the assembly process by requiring that a bolt or stud need only be stretched once. Further, it eliminates the need to measure the elongation of each bolt and stud.

Figure 9:
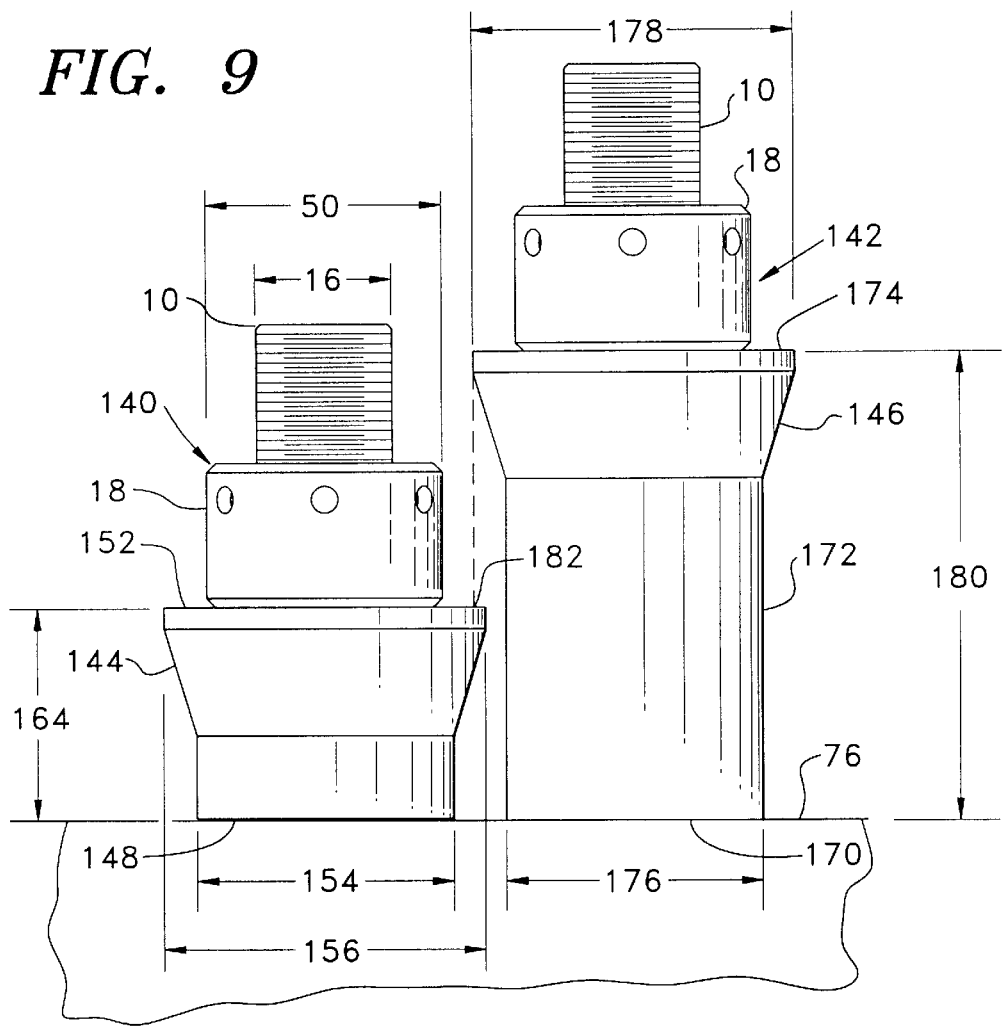
FIG. 9 illustrates an elevation of nut and bolt assemblies with different stool heights.

Left nut and bolt assembly 140 and right nut and bolt assembly 142, as depicted in FIG. 9, provide an alternate means to arrange a nut and bolt using stool 144 and tall stool 146, respectively. Stools 144 and 146 allow hydraulic tensioner 120 to be used to stretch a bolt when a bridge element cannot be used alone. Stool 144 has bottom face 148, stool body 150, top face 152, and bore 190 (see FIG. 10) extending from bottom face 148 to top face 152. Bore 190 has a diameter larger than diameter 16 of bolt 10. Bottom face 148 and top face 152 are round. Bottom face 148 has a diameter 154 that is approximately equal to outer diameter 50 of nut 18. Top face 152 has a diameter 156 which is larger than diameter 154. Stool body 150 has a height 164 as measured from bottom face 148 to top face 152.

Left nut and bolt assembly 140 is designed to allow a bridge element and hydraulic tensioner (not shown) to rest on top face 152 while tensioning bolt 10. This arrangement provides for the tensioning of bolt 10 even though no satisfactory bridge element could be designed to rest directly on surface 76. Further, the force from a hydraulic tensioner is distributed throughout the larger area of bottom face 148, as opposed to the smaller area consisting of where a wall bottom edge would rest on surface 76. As the force is distributed over a larger area, the risk of deforming surface 76 diminishes.

The combination of left and right nut and bolt assemblies 140 and 142, respectively, allow for closely pitched bolts 10 to be tensioned using a hydraulic tensioner. Nut and bolt assemblies 140 and 142 are similar in all respects except for height. Right nut and bolt assembly 142 has a tall stool 146, with a bottom face 170, a stool body 172, a top face 174, and a bore (not shown) extending from bottom face 170 to top face 174. The bore of tall stool 146 has a diameter larger than diameter 16 of bolt 10. Bottom face 170 and top face 174 are round. Bottom face 170 has a diameter 176 that is approximately equal to outer diameter 50 of nut 18. Top face 174 has a diameter 178 which is larger than diameter 176. Stool body 172 has a height 180 as measured from bottom face 170 to top face 174. Height 180 of tall stall 146 is greater than height 164 of stool 144. This difference in height allows portion 182 of top face 152 to lie in between top face 174 and surface 76. This arrangement allows for closely pitched bolts. This arrangement also necessitates the stretching of bolt 10 of left nut and bolt assembly 140 prior to the stretching of bolt 10 of right nut and bolt assembly 142.

Figure 10:
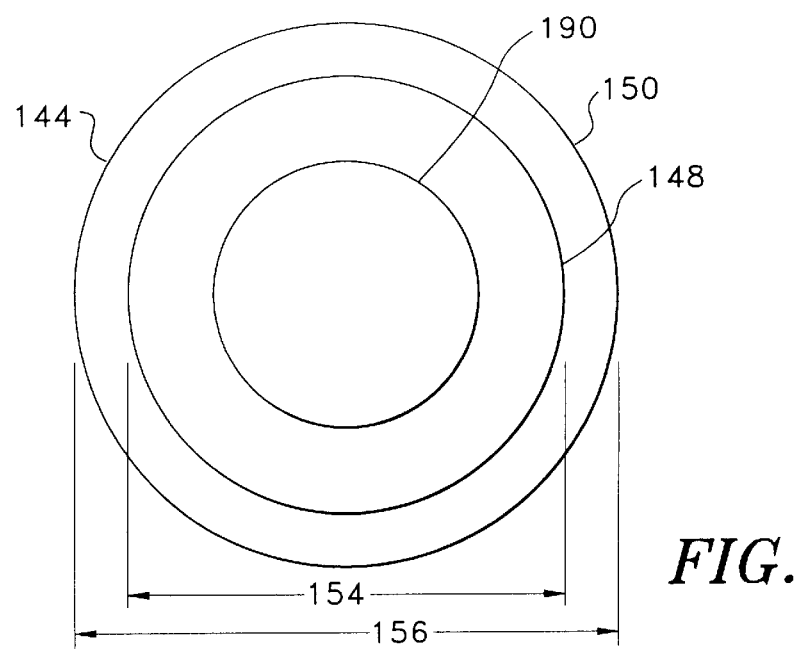
FIG. 10 illustrates a bottom plan view of a stool.

Referring to FIG. 10, bottom face 148 of stool 144 is pierced by bore 190, which is sized to accommodate bolt 10. Bottom face 148 has a diameter 154 which is smaller than diameter 156 of top face 152 (not visible). The bottom view of tall stool 146 is identical to FIG. 10. The invention is not limited, however, to stools with round bottoms and tops. Further, the invention is not limited to bottoms of the same diameter as the diameter of the nut which is adjacent to the stool's top face. All of these shapes can be constructed to complement and accommodate the surface of the flange and anything else in the vicinity of the bolt being tensioned.

Figure 11:
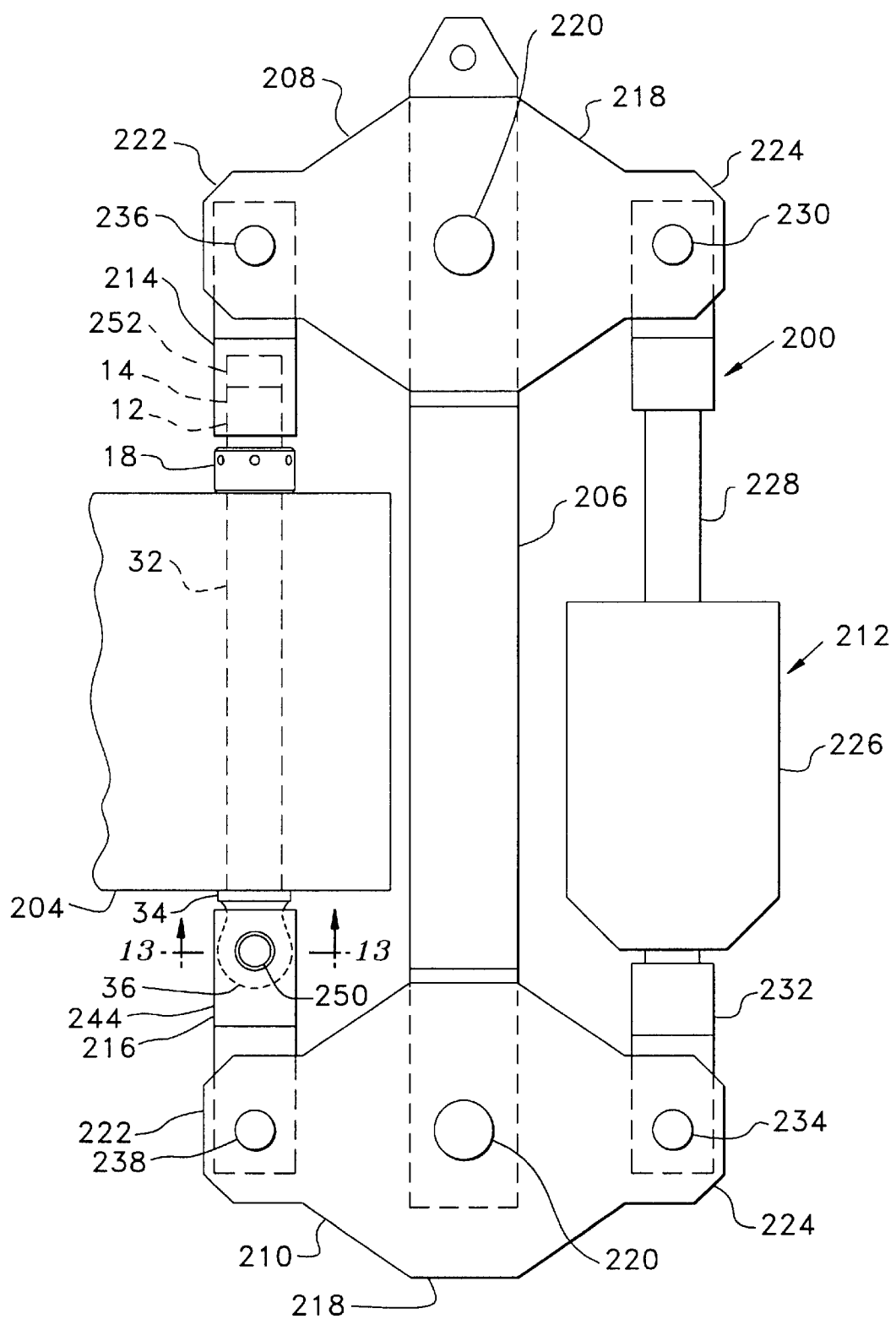
FIG. 11 illustrates a side plan view of a parallel action hydraulic tensioner stretching a bolt.
Figure 12:
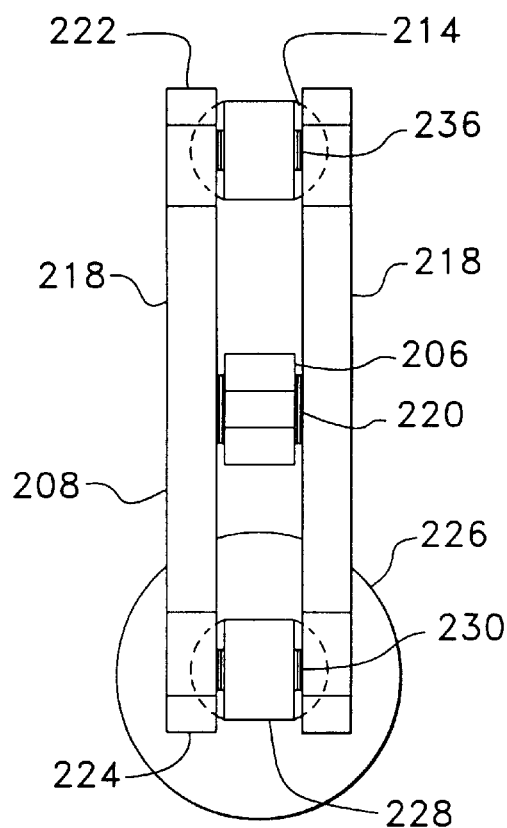
FIG. 12 illustrates a top plan view of a parallel action hydraulic tensioner.

Referring to FIGS. 11 and 12, parallel action hydraulic tensioner 200 is tensioning bolt 32 that extends through flanges 204. Tensioner 200 is an alternative tensioner to stretch bolts without resting a tensioner, either directly or indirectly, on flange 204. This is useful for when the flange is too small to accommodate a bridge element or the vicinity of the bolt being stretched does not allow for the use of hydraulic tensioner 120.

In the preferred embodiment, tensioner 200 is comprised of a central beam 206, a first member assembly 208, a second member assembly 210, a hydraulic load cell assembly 212, and a first attachment means 214 and a second attachment means 216 for attaching tensioner 200 to first and second ends 12 and 34 of ring bolt 32, respectively.

First and second member assemblies 208 and 210 are each a pair of identical plates 218. First and second member assemblies 208 and 210 have a front section 222 and a back section 224, depicted on the left and right of FIG. 11, respectively. Plates 218 straddle and are pivotally mounted to each end of central beam 206 via a pivot joint 220, respectively. Pivot joints 220 are located between front section 222 and a back section 224 of first and second member assemblies 208 and 210. First and second member assemblies 208 and 210 are mounted to central beam 206 such that the assemblies and plates 218 are parallel.

Hydraulic load cell assembly 212 is comprised of hydraulic load cell 226 with arms 228 and 232 which extend in opposite directions from hydraulic load cell 226. Arm 228 is connected at one end to the piston (not shown) of hydraulic load cell 226. The other end of arm 228 is pivotally connected via pivot joint 230 to back section 224 of first member assembly 208. Arm 232 is connected at one end to hydraulic load cell 226. The other end of arm 232 is pivotally connected via pivot joint 234 to back section 224 of second member assembly 210. As with central beam 206, plates 218 straddle arms 228 and 232.

Hydraulic load cell assembly 212, central beam 206, and first and second member assemblies 208 and 210 are arranged such that when hydraulic load cell 226 retracts its piston, back sections 224 of member assemblies 208 and 210 move closer to each other and front sections 222 move further apart. This is accomplished by first and second member assemblies 208 and 210 pivoting on pivot joint 220. The reverse result occurs when hydraulic load cell 226 extends its piston.

First attachment means 214 has an end that is pivotally connected via pivot joint 236 to front section 222 of first member assembly 208, similar to how arms 228 and 232 are connected to back sections 224. First attachment means 214 has another end that has a threaded sleeve 252 that engages parallel male thread 14 of ring bolt 32.

Figure 13:
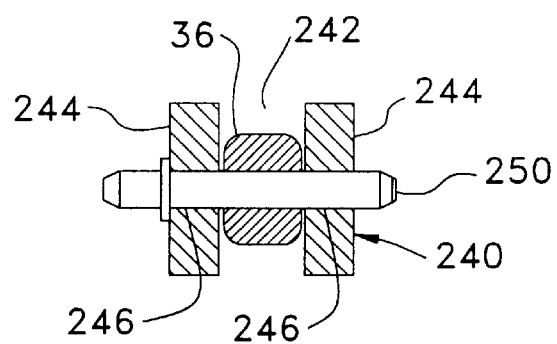
FIG. 13 illustrates a cross-section view of a ring of a ring bolt attached to a parallel action hydraulic tensioner.

Second attachment means 216 has an end that is pivotally connected via pivot joint 238 to front section 222 of second member assembly 210, similar to how first attachment means 214 is connected to front section 222 of first assembly member 208. Referring now to FIGS. 11 and 13, the other end 240 has a slot 242 between tongs 244. Slot 242 is parallel to plates 218 and is sized to accommodate ring 36 width-wise. Each tong 244 has a hole 246 extending through it, the holes 246 being aligned. Second attachment means 216 engages ring bolt 32 by inserting ring 36 in slot 242, aligning ring aperture 38 with holes 246, and inserting pin 250 through tongs 244 and ring 36.

Figure 14:
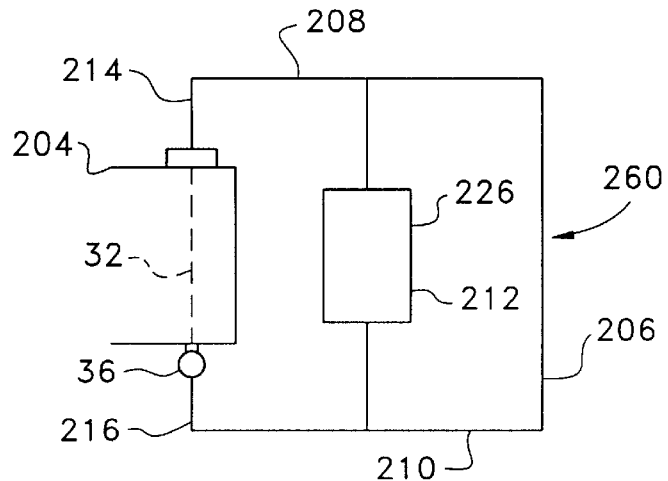
FIGS. 14, 15, and 16 illustrate schematic alternative arrangements of parallel action hydraulic tensioners.
Figure 15:
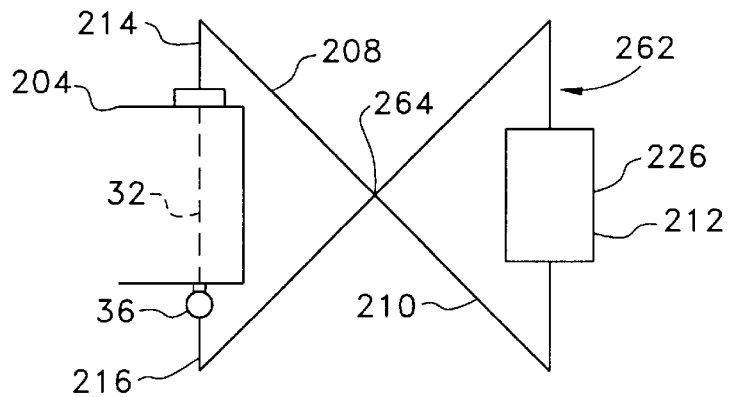
Figure 16:
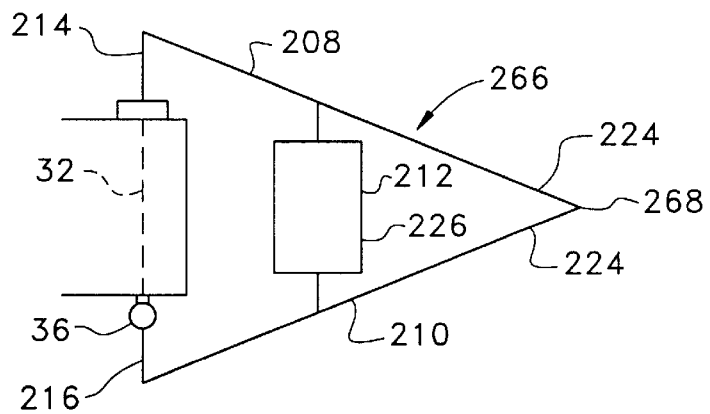

Once the ring bolt 32 is engaged to tensioner 200, ring bolt 32 can be stretched by hydraulic load cell 226 retracting its piston, causing front sections 222 to move apart and stretch ring bolt 32. Attention is drawn to central beam 206, which functions as a means for connecting first and second member assemblies 208 and 210. Alternative tensioner arrangements would also suffice. In FIG. 14, a schematic of an alternative parallel action tensioner 260 has central beam 208 and hydraulic load cell assembly 212 switched as compared to tensioner 200. In this arrangement, ring bolt 32 is stretched when the piston extends from hydraulic load cell 226. In FIG. 15, alternative parallel action tensioner 262 has central beam 206 removed and first and second member assemblies 208 and 210 crossed and connected via pivot joint 264. In this arrangement, ring bolt 32 is stretched when the piston extends from hydraulic load cell 226. In FIG. 16, alternative parallel action tensioner 266 is similar to alternative parallel action tensioner 260 except that central beam 206 is removed and first and second member assemblies 208 and 210 are connected via pivot joint 268 at back portions 224. As in the first two alternative parallel action tensioners, ring bolt 32 is stretched when the piston extends from hydraulic load cell 226.

Figure 18:
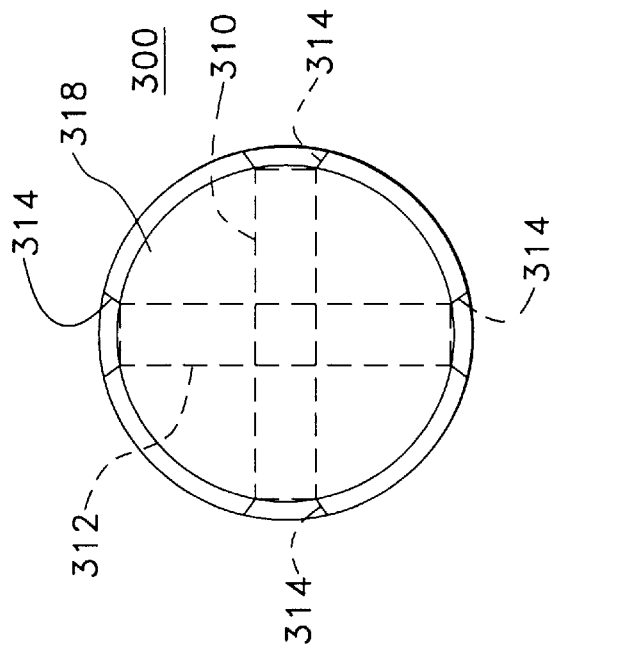
FIGS. 17 and 18 are two different views of a locking pin.
Figure 17:
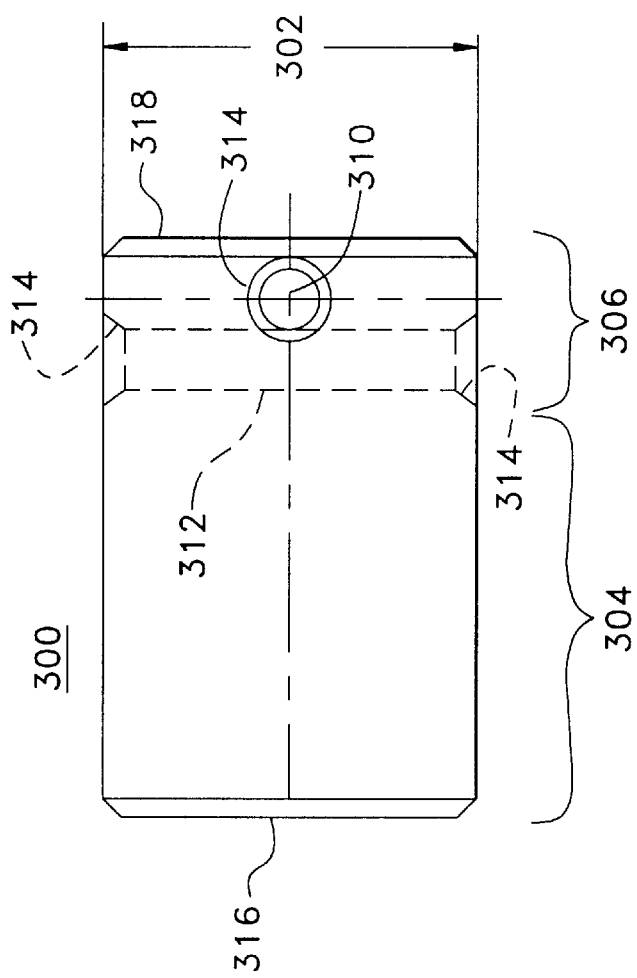

Now referring to FIGS. 17 and 18, a locking pin 300 with a diameter 302, a body portion 304, and a top portion 306 is used to wire adjacent nuts together. The diameter 302 is sized to fit inside a pin insertion hole which is one of the key holes in the nuts to be secured (discussed below). When in use, the body portion 304 is in the pin insertion hole with the top portion 306 extending therefrom. The top portion 306 has top aperture 310 and a bottom aperture 312 extending radially through the pin 300 and at generally right angles to each other. Other embodiments of the invention may have one or more apertures or the aperture(s) may not extend radially through the top portion 306. In the preferred embodiment of the invention, the apertures 310 and 312 do not intersect, but they may intersect in other embodiments of the invention. Each aperture has two chamfered openings 314 to ease directing lockwire through the holes. The bottom end 316 and the top end 318 of the pin 300 are also chamfered. Other embodiments of the invention may have non-chamfered shapes at the openings 314 and the ends 316 and 318.

Now referring to FIGS. 19, 20, 21, and 22, two adjacent nuts, a left nut 320 and a right nut 324 as shown in FIGS. 19 and 20, have been secured to axial tensioned bolts 322 and 326 respectively. The threaded ends of the bolts extend with the same general orientation through a surface 321, with the nuts disposed thereon. Each nut has six key holes 332 extending generally radially through the nut wall. Other embodiments of the invention may have more or less key holes and the key holes may only partially extend through the nut walls. Two locking pins 300A and 300B have been secured to the left and right nuts 320 and 324 and each other with lockwire pieces 328, 330, and 331. The term "lockwire" shall be understood to mean lockwire or any suitable equivalent.

The locking pins 300A and 300B are first secured to their respective nuts. The locations of the locking pins in the nuts are described in terms of a clock face. The 3 o'clock positions 334 and 9 o'clock positions 336 of the nuts are defined by a line 344 extending through centers 342 of the bolts 322 and 326. The key holes 332 are located at the 12, 2, 4, 6, 8, and 10 o'clock positions. The locking pin 300A is inserted in a pin insertion hole 332A which is the key hole 332 at the 12 o'clock position 338 of the left nut 320. The locking pin 300A is aligned such that the axis of the bottom aperture 312 is generally perpendicular to the general orientation of the bolts. The lockwire piece 330 is passed through the bottom aperture, wrapped around the outer surface 358 of the nut 320, and its ends are secured together to form a knot 346, thus securing the locking pin 300A in the pin insertion hole 332A. Other embodiments may use an equivalent securing means for securing the pin 300A in the pin insertion hole 332A. FIG. 21 shows a detail of the locking pin 300A secured to the left nut 320 with the piece of lockwire 330. The locking pin 300B is inserted in a pin insertion hole 322B at the 6 o'clock position 340 of the right nut 324. The locking pin 300B is positioned and secured to the right nut with the piece of lockwire 331 in the same fashion as the locking pin 300A is secured to the left nut.

The locking pins 300A and 300B are then secured to each other. The lockwire piece 328 is directed through the upper aperture 310 of the locking pin 300A such that one end of the lockwire is longer than the other. The two ends are partially twisted together such that both the long and short ends are loose. The long end is directed through the upper aperture 310 of the locking pin 300B, pulled tight, and twisted back around itself until it reaches the loose, short end of the piece. The short and long ends are twisted together to form a knot 348. Other embodiments of the invention may have the lockwire piece 328 securing the two pins in an equivalent means or may have the lock wire piece 328 extending through 300B first. FIG. 22 shows a detail of the locking pin 300A with the lockwire piece 328 extending through the top aperture 310 (the lockwire piece 330 is absent to clearly show the lockwire piece 328).

In a preferred embodiment of the invention, the lockwire piece 328 extends away from the locking pins 300A and 300B in the general direction of the tightening direction of rotation 350 and 352 of nuts 320 and 324, respectively. As the tightening direction of rotation is typically clockwise, the lockwire piece 328 generally extends diagonally down from the 12 o'clock position 338 of the left nut 320 to the 6 o'clock position 340 of the right nut 324. In this arrangement, the lockwire piece 328 prevents both nuts from rotating the opposite of the tightening direction of rotation and disengaging from their bolts. The purpose of twisting the lockwire piece upon itself is to inhibit the lockwire from vibrating. The lockwire piece 328 is not straight, but bends at segments 354 and 356 from the lockwire piece being in contact with the nuts. Other embodiments of the invention may have other lockwire arrangements of one or more pieces.

An advantage of the present invention is that additional holes need not be drilled in nuts disclosed in the present invention to lockwire the nuts together. This system of lockwiring nuts together may also be practiced with polygonal nuts—such as hexagonal nuts 400 with keyholes 402 as shown in FIG. 23. Further, the invention may be practiced on non-rotated, axial tensioned bolt and nut systems; rotated, axial tensioned bolt and nut systems; and non-tensioned bolt and nut systems. The invention may also be practiced on a plurality of nuts or nuts that are of different heights. Therefore, the present invention may be embodied in other specific forms without departing from the spirit or essential attributes thereof and, accordingly, reference should be made to the appended claims, rather than to the foregoing specification, as indicating the scope of the invention.

I claim:

1. A bolting system comprising:
   a) first and second bolts extending in the same general orientation through a surface, wherein each of said bolts has a threaded end;
   b) first and second nuts engaged with said first and second bolt threaded ends, respectively, wherein each of said nuts has:
      i) a nut wall with a threaded inner surface and an opposing outer surface; and
      ii) a pin insertion hole radially extending at least partially through said nut wall from said outer surface;
   c) first and second locking pins disposed in said first and second nut pin insertion holes, respectively, each of said locking pins having a top portion extending from said respective outer surface with at least one locking pin aperture extending through said top portion;
   d) a first securing portion extending through said at least one aperture of said first locking pin and being secured around said first nut outer surface;
   e) a second securing portion extending through said at least one aperture of said second locking pin aperture and being secured around said second nut outer surface; and
   f) a third securing portion being secured through said at least one locking pin aperture of each of a said first and second locking pins.

2. The bolting system of claim 1, wherein said first, second, and third securing portions are first, second, and third lockwire portions, respectively.

3. The bolting system of claim 2, wherein said first, second, and third lockwire portions collectively comprise one or more pieces of lockwire.

4. The bolting system of claim 2, wherein:
   a) said at least one aperture in each of said first and second locking pin top portions comprises first and second apertures extending radially therethrough and at general right angles to each other and said first apertures are generally oriented perpendicular to said bolt orientation;
   b) said first lockwire portion extends through said first aperture of said first locking pin;
   c) said second lockwire portion extends through said first aperture of said second locking pin; and
   d) said third lockwire portion extends through said second apertures of said first and second locking pins.

5. The bolting system of claim 4, wherein said first, second, and third lockwire portions each have two ends that are secured to each other.

6. The bolting system of claim 4, wherein:
   a) said first and second nuts each have a tightening direction of rotation; and
   b) said third lockwire portion extends away from said first and second locking pins in a direction generally equivalent to said tightening direction of rotation of said first and second nuts in which said respective locking pins are disposed.

7. The bolting system of claim 6, wherein:
   a) said first and second nuts each have a plurality of wall holes distributed about said outer surface, wherein one of said wall holes in each of said first and second nuts is said pin insertion hole;

b) said first bolt is to the left of said second bolt such that a line defined by the center points of said threaded ends extends through a 3 o'clock position of the first nut and a 9 o'clock position of the second nut;

c) said first nut pin insertion hole is located generally at a 12 o'clock position of the first nut; and d) said second nut pin insertion hole is located generally at a 6 o'clock position of the second nut.

8. The bolting system of claim 7, wherein said third lockwire portion:

a) extends through said second apertures of said first and second locking pins; and b) contacts said outer surface of said first and second nuts such that said third lockwire piece is not straight.

9. The bolting system of claim 1, wherein said first and second bolts are axially stretched.

10. The bolting system of claim 9, wherein said first and second bolts are axially stretched without rotating said first and second nuts, respectively.

11. The bolting system of claim 10, wherein said first and second nuts have a cylindrical outer surface.

12. The bolting system of claim 9, wherein said first and second nuts are polygonal nuts.

* * * * *